March 24, 1964 F. E. VAN DUSEN 3,125,991
STANCHION FEEDING AND BEDDING APPARATUS
Filed Oct. 6, 1961 3 Sheets-Sheet 1
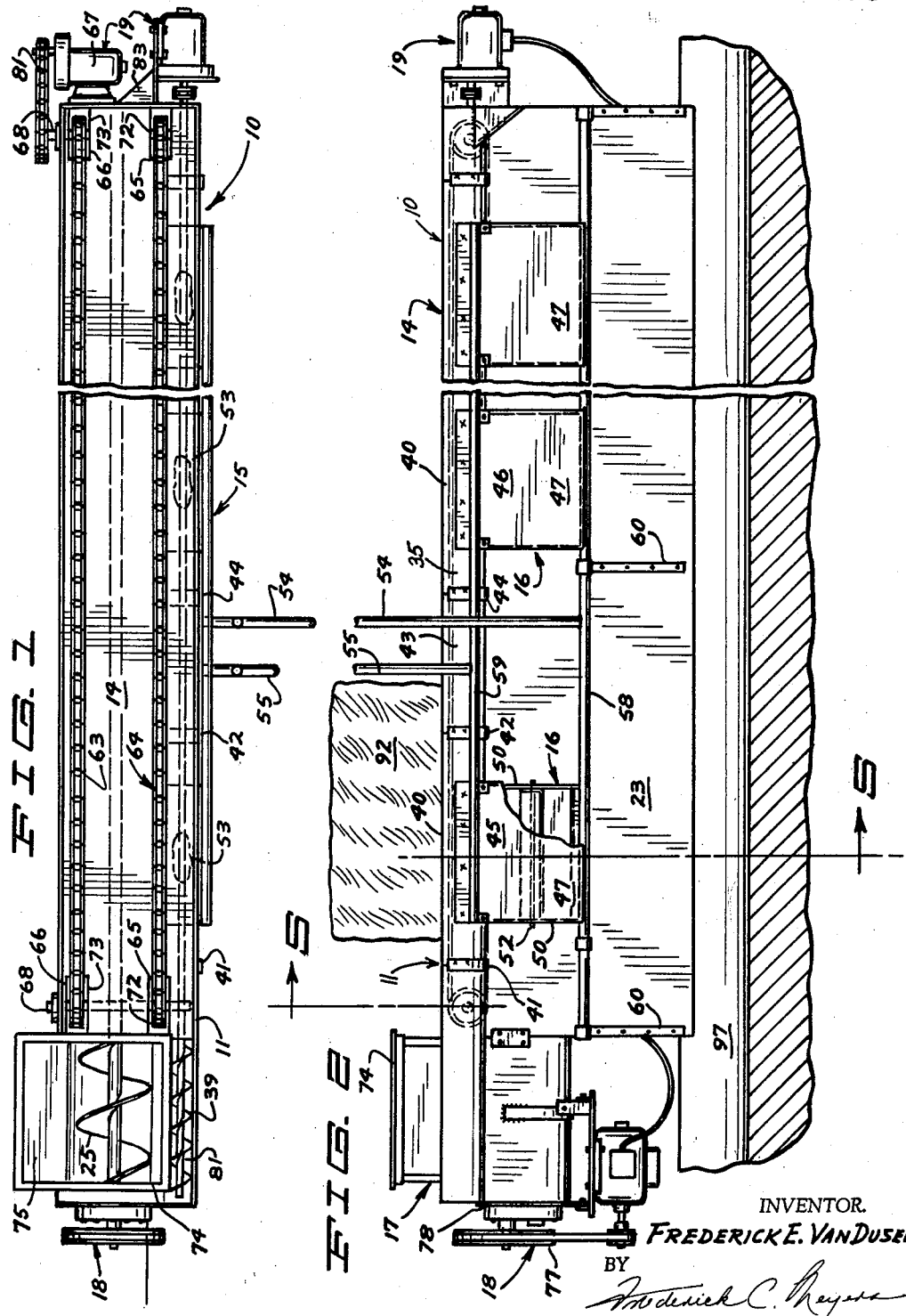
INVENTOR.
FREDERICK E. VAN DUSEN
BY
ATTORNEY March 24, 1964    F. E. VAN DUSEN    3,125,991
STANCHION FEEDING AND BEDDING APPARATUS
Filed Oct. 6, 1961    3 Sheets-Sheet 2
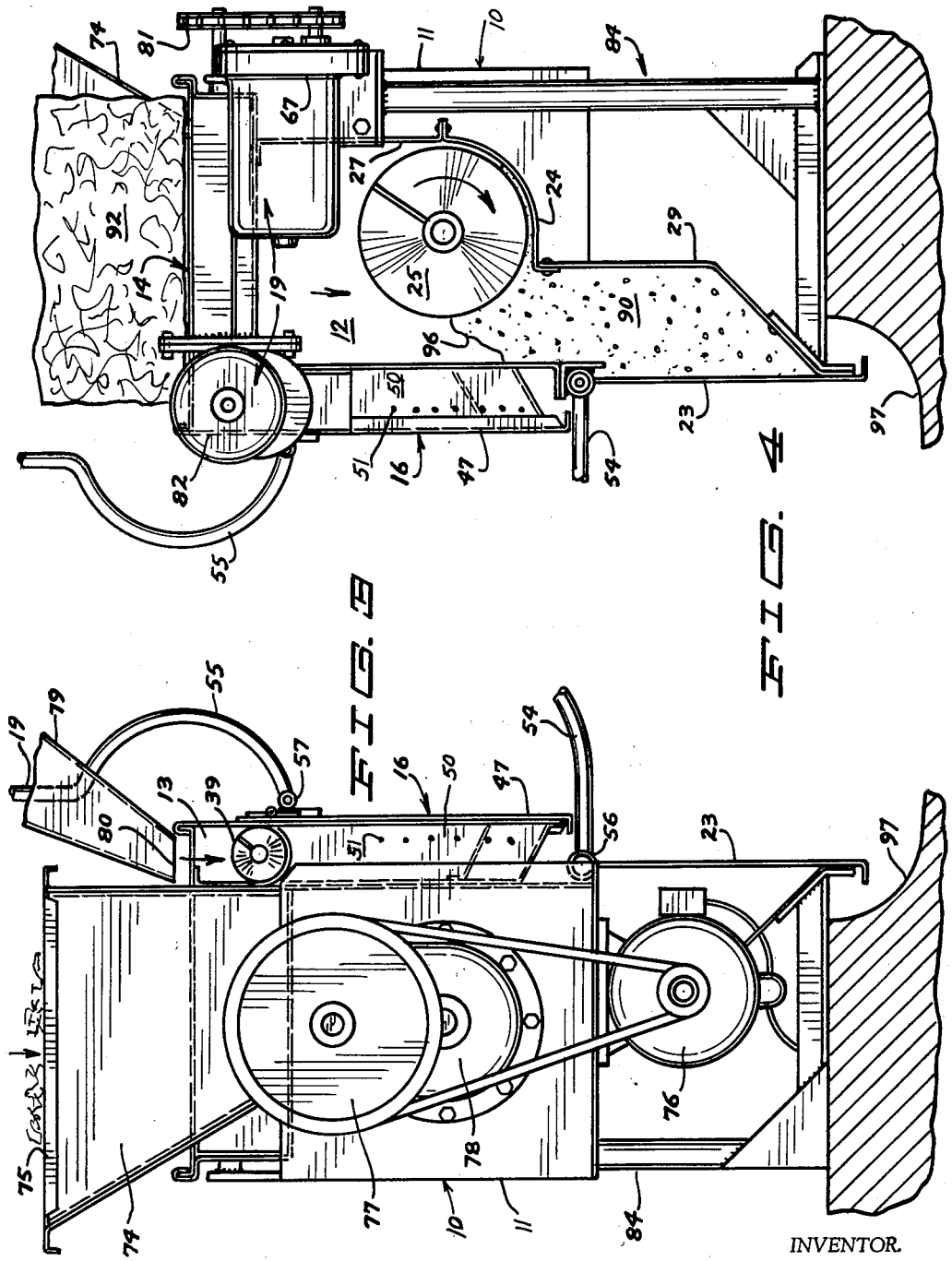
INVENTOR.
FREDERICK E. VAN DUSEN
BY
*Frederick C. Meyers*
ATTORNEY

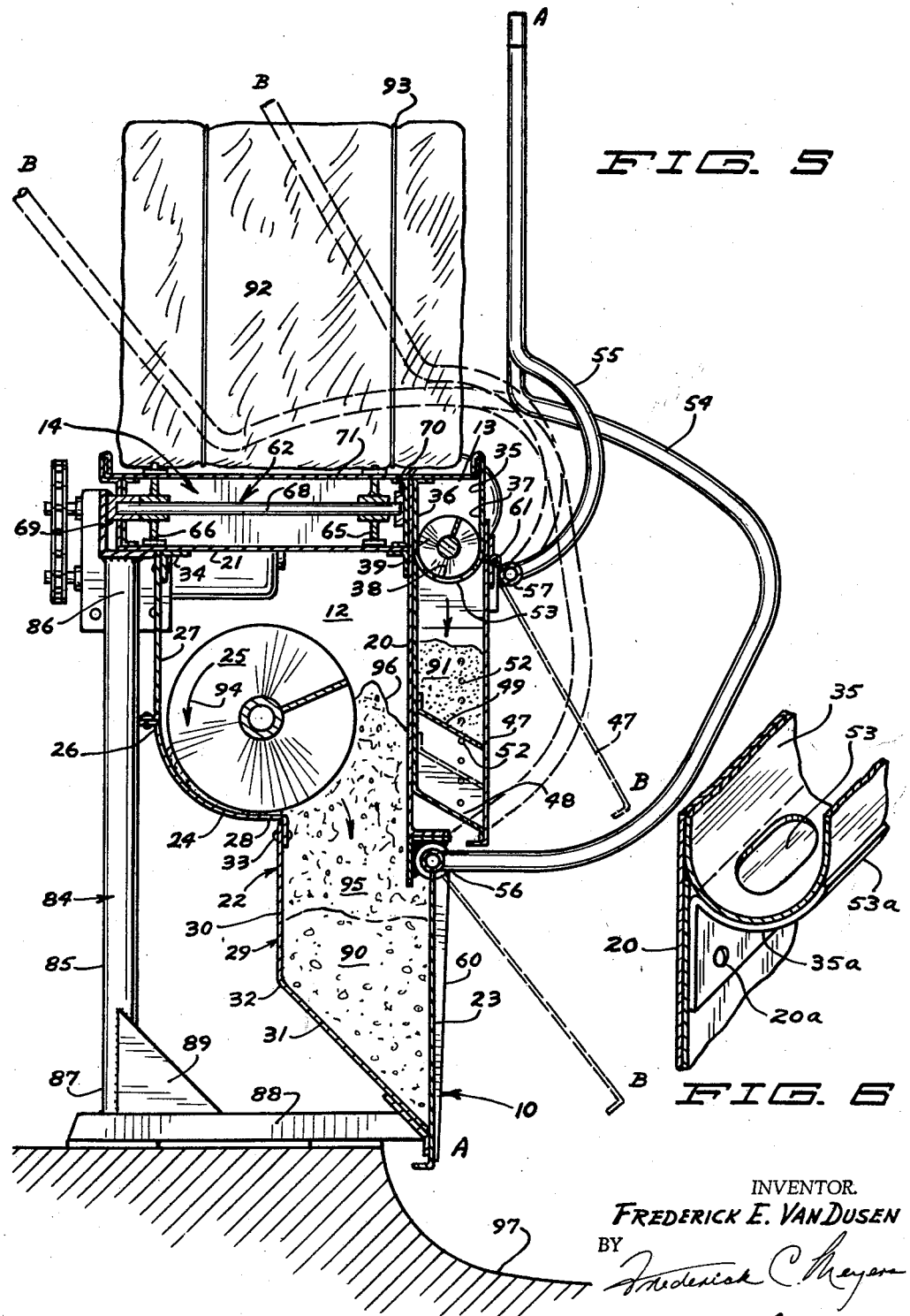

United States Patent Office 3,125,991
Patented Mar. 24, 1964

3,125,991
STANCHION FEEDING AND BEDDING
APPARATUS
Frederick E. Van Dusen, Wayzata, Minn., assignor to
Van Dusen & Co., Inc., Wayzata, Minn., a corporation
of Minnesota
Filed Oct. 6, 1961, Ser. No. 143,331
18 Claims. (Cl. 119—56)

This invention relates to farm machinery and more particularly to a livestock feeding and bedding apparatus.

One aspect of farming in which appreciable labor-saving effort has been concentrated is that of fedeing and caring for livestock. Mechanization in this particular area has become of prime interest in recent years with the evolution of large dairy farms.

In regard to the above discussion, it is within the contemplation of this invention, and a general object thereof, to provide an efficient and economical mechanized feeding and bedding apparatus for livestock.

More specifically, an object of this invention is to provide a feeding and bedding apparatus for milk cows which is compact in size and versatile, being readily adaptable to either newly constructed or existing barn structures.

A further object of this invention is to provide an apparatus which supplies two or more feeds and also conveys bales of hay or bedding in a simultaneous or successive operation to individual animal stanchions whereafter successive discharge of different kinds of feeds may be effected to supply the individual mangers.

A still further object of this invention is to provide apparatus as set forth above which has adjustable feed compartments wherein the feeds may be positively fed and proportioned in predetermined quantities.

Another object is to provide a conveyance apparatus of the class described which utilizes auger conveyance means of simplified construction which makes unnecessary a completely enclosed tubular auger housing.

A further object is to provide an apparatus as set forth above which is free-flowing and requires a minimum of operator surveillance during opeartion thereof.

And a still further object is to provide a livestock feeding and bedding conveyance apparatus which has removable drive means capable of securement at either end of the apparatus, thus allowing reversed orientation of the apparatus housing with respect to the drive means.

These and other objects and advantages of this invention will more fully appear from the following description, made in connection with the accompanying drawings wherein like reference characters refer to the same or similar parts throughout the several views and in which:

FIGURE 1 is a top view of the livestock feeding and bedding conveyance apparatus, repetitious portions thereof being removed beyond the broken lines;

FIGURE 2 is a front view of the apparatus shown in FIGURE 1, also having repetitious portions not necessary to a full understanding thereof removed beyond the broken lines;

FIGURE 3 is an enlarged end view of the apparatus shown in FIGURES 1 and 2, the view being taken from the left of FIGURE 2;

FIGURE 4 is an enlarged end view taken from the right of FIGURE 2, portions of the end plate having been cut away to show internal construction;

FIGURE 5 is a cross-sectional end view of FIGURE 2 taken on line 5—5 whereby to show the internal structure of the apparatus on an enlarged scale; and, FIGURE 6 is an enlarged segment of a primary section showing a shield position to inactivate discharge of feed.

Referring now generally to FIGURES 1, 2 and 5, and more specifically to FIGURE 5, the apparatus of the the present invention will be described. The livestock feeding and bedding conveyance apparatus referred to generally as 10 has a main elongate housing 11 which in turn has a pair of horizontal and longitudinal conveyance openings or chambers therethrough, as seen in FIGURE 5, which are indicated by numerals 12 and 13. Forming a part of the housing 11, and located on the upper portion thereof, is a bed area 14 upon which is located an apron for longitudinal conveyance of baled products such as bedding, forage, etc., which will be discussed subsequently.

Secured along the frontmost portion 15 (FIGURE 1) of the housing is a plurality of bins or feed traps 16 as seen in FIGURE 2. Finally, located at the left end of the housing, as viewed in FIGURE 2, is a hopper structure 17 with its associated drive means 18, and at the rightmost end of the same figure, a second drive means 19 which is not interconnected with the hopper structure 17.

Referring more specifically to FIGURE 5, the larger of the longitudinal conveyance openings, referred to henceforth as the forage chamber 12 is defined by a front wall 20, an upper wall 21, a rear wall referred to generally as 22, and a forage trap door 23.

In more detail, the rear wall 22 consists of a main arcuately-formed auger feed trough plate 24 which, as shown, is a substantially quarteround piece with respect to the elongate screw conveyance means or auger 25. Secured to the upper end 26 of trough plate 24 is a continuous rear panel or trough sidewall portion 27 and secured to the lower end 28 of the trough plate 24 is an angle wall 29 which has a vertical portion 30 and an angulated lower portion 31 joined at bend 32. The various components of the rear wall 22 may, of course, be secured together by any of the conventional means such as rivets or bolts, and angle plates such as indicated by the numbers 33 and 34. Likewise, the remaining components of the housing may be secured together with similar elements so that further detailed explanation thereof will be avoided henceforth.

Also forming a part of the housing 11 is a second longitudinal conveyance opening 13 which is of much smaller size and volume than was opening 12. Opening 13, referred to henceforth as the feed chamber, is briefly defined by a U-shaped plate 35 which forms both the side walls 36 and 37 as well as a rounded bottom 38 upon which screw conveyance means or auger 39 rides.

Construction of the apparatus disclosed in this invention contemplates that the forage chamber 12 be defined by the respective walls which extend, as a single piece, for the entire length of the apparatus. However, with reference to FIGURES 1 and 2, the feed chamber 13 is defined by sections of the U-shaped plate 35 which extend for different lengths along the longitudinal dimension of the housing. Referring to FIGURE 2 for example, a typical primary section 40 would be that defined by the length between joints 41 and 42. Another typical spacer section 43 is defined by the distance between joint 42 and joint 44. The purpose for having the feed chamber 13 defined by these variable length sections is so that, in the final installation of the conveyance apparatus, the feed traps 16 may be precisely positioned at the center of each stanchion in which the particular animals are locked.

The primary section 40 represents a section having a minimum length which would typically exist between stanchions. For example, assume each head of cattle had a stanchion width of 4½ feet as a standard and universally acecpted stanchion width. In this instance, section 40 could be likewise 4½ feet in length. If the apparatus was intended for installation in a barn having stanchion widths of 5½ feet, it follows that the length of section 40 of 4½ feet would have to be increased by one foot so that the next feed trap 16 would be likewise centrally positioned with respect to the adjacent stanchion. In this event, spacer section 43 would be the one foot section which it to be inserted. Thus, as hypothesized in the example above, if the stanchions were 5½ feet in width, feed trap 45 would be 5½ feet from feed trap 46, center line to center line, while sections 40 could each be 4½ feet in length and section 43 one foot in length.

Referring more particularly to FIGURE 5 now, the feed traps 16 are formed by a cover plate or feed trap door 47 which closes down upon a pair of trap bottoms, bottom 48 being stationary, and adjustable false bottom plate 49 being movable vertically. In this regard, it is pointed out that the volume within the feed trap 16 will vary according to the height of the movable false bottom 49. The feed traps 16 are finally enclosed by a pair of side walls 50 which have a plurality of holes or apertures 51 vertically spaced therein for location of a supporting rod 52 (FIGURES 2 and 5) which the false bottom 49 is secured to. Thus, merely moving the rod 52 from aperture to aperture will allow vertical movement and positive location of the false bottom 49. In this manner, the volume within the feed trap may be adjusted from an upper or minimum value to a lower or maximum value closely overlying trap bottom 48. The feed traps 16 are filled with feed product through gravity discharge ports or openings 53 (see FIGURE 1) which are simply formed in the bottom of the U-shaped plate 35 and centrally positioned over each feed trap. A shield element 35a (FIGURE 6) has an arcuate upper plate 53a and is adapted to be removably mounted through fastening means 20a to the back wall of a feed trap. The plate 53a then lies in marginal contact beneath port 53 to eliminate discharge of grain or the like at any particular manger location.

Operably connected to the forage trap door 23 is a door opening means or manually operated handle 54. Also connected to feed trap doors 47 is a similar door opening means such as manually operated handle 55. The handle means are secured at the lower ends 56 and 57 respectively to longitudinally extending rods 58 and 59 as seen in FIGURE 2. Longitudinal rod 58 is secured to the forage trap door 23 by means of door straps 60. This arrangement causes the entire door 23 for the entire length of the apparatus to open in one operation of the handle means. Longitudinal rod 59 likewise is secured to each of the feed trap doors 47 in a ganged fashion whereby operation of handle means 55 will likewise open all of the doors 47 simultaneously as they pivot about their hinge connection 61.

As previously set forth, at the upper portion of the housing 11 is a flat bed area 14 which provides a cover and structural bracing for the housing 11 and also serves for conveyance of hay or bedding materials. In more detail now, the conveyor consists of an apron or chain conveyor referred to generally as 62 which, as more clearly seen in FIGURE 1, consists of a pair of chains 63 and 64, positioned on either side of the bed area 14, that are driven by sprockets 65 and 66 adjacent motor 67 of drive means 19. As seen in FIGURE 5, sprockets 65 and 66 are mounted upon a sprocket shaft 68 which, in turn, is journaled to bed walls 69 and 70. So that the bedding or baled hay is not allowed to foul the sprockets and chains during conveyance upon the bed 14, a false plate 71 is provided upon which the chains ride until they approach the sprockets 65 and 66 at which time they ride below the surface of false plate 71 through the respective sprocket openings 72 and 73 (see FIGURE 1).

Referring now to FIGURES 1 and 3 in particular, the feeding mechanism for the forage chamber 12 will be explained. As a separate element and separable from the main portion of the housing 11, a hopper structure 74 is provided which, in the usual and conventional way, receives forage or silage through the upper opening 75. Positioned adjacent the bottom of the hopper 74 is the auger 25 for conveyance of the silage throughout the length of the housing.

Mounted externally of the hopper is the drive means 18 (see FIGURE 2) which consists primarily of a motor 76 which drives a pulley 77. Drive pulley 77 in turn, through gear reduction box 78, drives the auger 25.

In regard to feeding apparatus associated with chamber 13, FIGURE 3 reveals a typical grain chute 79 which may have its spout 80 positioned over the auger conveyor 39 whereby cattle feed, such as ground corn and oats, is allowed to discharge into chamber 13 by way of feed opening 81 (see FIGURE 1).

FIGURE 4 discloses in greater detail the particular arrangement of the drive means 19 with respect to the right end of the housing as viewed in FIGURES 1 and 2. Motor 67 drives the chain conveyor 62 by way of chain drive 81. In adidtion, motor 82 is caused to directly drive the auger conveyor 39. It will at this point be noted that drive means 19 is mounted upon a plate arrangement 83 (see FIGURE 1) which may be separated and removed from the main housing 11 in a similar manner to that of the forage hopper assemblage 74. This points up a particular advantage of this invention in that the housing 11 may be reversed end for end and the hopper 74 and drive means 19 installed upon the opposite ends thereby allowing feed and forage to be discharged from a point 180 degrees reversed from that shown in FIGURES 1 and 2. Thus versatility is gained with this feeding apparatus which is particularly useful in cattle barns having a pair of stanchion rows spaced from each other such that the cattle, while locked within their stanchions, will face each other across the feed manger.

Considering that in some instances the feeding apparatus will be of considerable length, it is imperative that adequate structure will be required to support the various components of the housing. Therefore, as disclosed in particular in FIGURE 5, a supporting framework referred to generally as number 84 is provided which simply consists of a vertical standard 85 that is secured in supporting relation at the upper end 86 to the bed area 14 and at the lower end 87 to a foot plate 88 by brace plate 89.

Regarding the use and operation of this invention, it is within the contemplation thereof that three principal types of bulk animal food product for cattle or livestock be handled, namely, silage or other forage products 90 within forage chamber 12, ground feed and the like such as ground corn and oats 91 within feed chamber 13, and dry stalk product 92, such as hay, which is preferably baled as shown in FIGURE 5, and bound with baling twine 93 in the usual and conventional manner. It is understood, of course, that other products similar to those considered above may likewise be handled by this apparatus if desired.

Assuming for the sake of illustration that, in regard to FIGURES 1 and 2, a head of cattle was positioned in a stanchion before each of the feed traps 16, silage is fed into the forage hopper 74 after which the drive means 18, which causes the auger to rotate, conveys the silage material lengthwise down the feeding apparatus in forage chamber 12. To accomplish such distribution, the auger 25 (see FIGURE 5) is rotated in the direction as indicated by the arrow 94. In this manner, the auger, while in rotational contact with the arcuate surface of trough plate 24, will tend to frictionally remain thereon. Since the end of the auger, which is at the end opposite of drive means 18, is free floating, it is seen that the auger weight will cause it to ride upon the auger trough plate 24 and because of its rotation will be prevented from falling off of the trough plate down into the forage storage area 95. It is noted that rear wall portion 27 and trough plate 24 form what appears as a J-shaped wall. This wall forms a novel portion of this invention in that it is simply designed and utilizes the basic concepts of an auger conveyance means for retaining the auger in its desired position. In this manner, the completely enclosing cylindrical housing which is usually associated with an auger conveyance system is completely avoided.

The auger in rotation will cause the silage to traverse the length of the housing and forage chamber 12, depositing the silage 90 first at the end closest the drive means, and progressively filling the chamber to some height denoted by number 96. As the forage begins to pile up to the level of number 96, further pile-up is prevented as the auger would tend to carry any extra silage further on through the forage channel 12 whereby the entire chamber 12 is ultimately filled to the height 96.

After the chamber 12 is filled as described, the simple operation of moving the handle means 54 from position "A" to position "B" will cause the entire forage trap door 23 for the length of the housing to be raised from position "A" to position "B" thereby allowing the silage to be gravitationally deposited into a manger represented in part by number 97.

Regarding the feed operation, feed is conveyed from the grain chute 79 into the grain auger conveyor 39 whereafter the motor 82 will cause the grain to be drawn over the length of the housing, depositing grain first in the feed trap 45 (see FIGURE 2) then feed trap 46 and so on until all of the feed traps 16 are filled. Of course, as described above, the feed trap bottoms 49 may be adjusted so that any particular volume of feed will be deposited within each feed trap 16. The feed is deposited into the feed traps from the chamber 13 via the openings 53 (see FIGURE 1).

Again, as with the forage 90, the feed trap doors 47 may be all simultaneously opened by simply moving handle means 55 from the "A" position to the "B" position as shown in FIGURE 5. Thus, silage may be initially deposited within the manger 97 after which individually measured quantities of feed 91 may be deposited upon the silage. It is readily seen therefore that a complete feeding operation of feed and silage to several cattle may be accomplished simultaneously through the simple operations of handle means 54 and 55. Thus time and expense is minimized for the individual operator.

Assuming next that it is desired to feed hay or supply the individual stanchions with straw bedding, it is a simple operation to merely load the baled product 92 upon the open chain conveyor 62 after which the drive means 19 or motor 67 will cause the conveyor to draw the baled product along the length of the apparatus. Because of the nature of baled products, it is found that the chains 63 and 64 themselves provide the necessary gripping force to the bale for conveyance, however, the chain conveyor may be modified slightly whereby cross slats are incorporated to convey loose products such as loose hay or straw. After the hay or straw is conveyed to the desired location along the stanchion rows, the product may thereafter be removed and disseminated as desired.

It will be readily seen now from the above description that the particular apparatus disclosed is very useful in the feeding and bedding of several head of cattle where a considerably lengthy manger is involved. Rather than the usual manual pitching of silage into the respective stanchion areas and dumping of feed, all that need be done is to energize the conveyance means and then to simply, by manual operation, unload the feeds to the respective locations. Such a conveyance means is of particular usefulness where any number of cattle from 10 or 15 on up, for example, are stanchioned adjacent one another in a row. If some of the cattle require more or less feed than others or if some require no feed at all, it is a simple procedure to move or regulate the feed trap bottom 49 to the desired location thereby allowing precise measurement of the feed to be deposited at the feeding time.

It will, of course, be understood that various changes may be made in the form, details, arrangements and proportions of the parts without departing from the scope of this invention as set forth in the appended claims.

What is claimed:

1. A livestock feeding and bedding conveyance apparatus comprising, a housing divided into a pair of parallel longitudinal chambers laterally offset from each other, a conveyance means positioned in each of said longitudinal chambers and adapted for conveyance of animal food products, first discharge means at a particular elevation associated with one of said chambers for discharging the food therein into a given area, second discharge means at a lower elevation associated with the other of said chambers for discharging the food contained therein to said same area, an open conveyance means positioned on the top of said housing in an overlying relation with said other chamber and adapted for conveyance of bedding and the like, and drive means for driving each of said conveyance means.

2. A livestock feeding and bedding conveyance apparatus comprising, a housing divided into a pair of parallel longitudinal chambers laterally offset from each other, a screw conveyance means positioned in each of said longitudinal chambers and adapted for conveyance of animal food products, first discharge means at a particular elevation associated with one of said chambers for discharging the food therein into a given area, second discharge means at a lower elevation asociated with the other of said chambers for discharging the food contained therein to said same area, a continuous chain conveyor means positioned on the upper side of said housing in an overlying relation with said other chamber and adapted for conveyance of baled forage and the like, and drive means for driving each of said conveyance means.

3. An animal feeding and bedding conveyance apparatus comprising, a housing divided into a pair of parallel longitudinal chambers laterally offset from each other, a screw conveyance means positioned in each of said longitudinal chambers and adapted for conveyance of bulk animal food products, a supporting feed trough underlying each said screw conveyance means and fixedly secured to said housing, first discharge means at a particular elevation associated with one of said chambers for discharging the food therein into a given area, second discharge means at a lower elevation associated with the other of said chambers for discharging the food contained therein to said same area, a continuous chain conveyor means positioned on the upper side of said housing in an overlying relation with said other chamber and adapted for conveyance of baled forage and the like, and drive means for driving each of said screw conveyance means and said chain conveyor means.

4. An animal feeding and bedding conveyance apparatus comprising, a housing divided into a pair of parallel longitudinal chambers laterally offset from each other, an elongate auger conveyor positioned in each of said longitudinal chambers, one of said auger conveyors being adapted to convey feed such as ground grain to predetermined animal feed stations at spaced intervals along the length of said housing and the other of said auger conveyors being adapted to convey forage such as silage and deposit the same along the length of said housing, first discharge means at a particular elevation associated with one of said chambers for discharging the food therein into a given area, second discharge means at a lower elevation associated with the other of said chambers for discharging the food contained therein to said same area, a continuous chain conveyor means positioned along the upper side of said housing in an overlying relation with said other chamber and exposed exteriorly thereof, said chain conveyor means being adapted for conveyance of baled forage, and drive means for driving each of said auger conveyors and said chain conveyor.

5. An animal feeding and bedding conveyance apparatus comprising, an elongate housing divided into a pair of parallel longitudinal chambers laterally offset from each other, each said longitudinal chamber having means for external exposure thereof for at least a portion of its length, an elongate screw conveyor positioned in each of said longitudinal chambers adapted for individual conveyance of different types of animal food, first discharge means at a particular elevation associated with one of said chambers for discharging the food therein into a given area, second discharge means at a lower elevation associated with the other of said chambers for discharging the food contained therein to said same area, a continuous chain conveyor means longitudinally positioned and traveled along the upper side of said housing in an overlying relation with said other chamber and exposed exteriorly thereof, said chain conveyor adapted for conveyance of baled forage such as hay and straw, and drive means for driving said screw conveyors and said chain conveyor.

6. An animal feeding and bedding conveyance apparatus comprising, a housing divided into a pair of parallel longitudinal chambers laterally offset from each other, a screw conveyance means positioned in each of said longitudinal chambers and adapted for conveyance of animal food products, said housing further having a bed-formed on the upper surface thereof, first discharge means at a particular elevation associated with one of said chambers for discharging the food therein into a given area, second discharge means at a lower elevation associated with the other of said chambers for discharging the food contained therein to said same area, an open chain-driven conveyance means positioned on the top of said housing in an overlying relation with said other chamber and adapted for longitudinal conveyance of animal bedding and the like, and drive means for driving each of said conveyance means.

7. An animal feeding and bedding conveyance apparatus comprising, an elongate housing divided into a pair of parallel longitudinal chambers laterally offset from each other, an elongate auger conveyor positioned in each of said longitudinal chambers and adapted for conveyance of animal food such as feed and forage products, a feed trough underlying at least one of said auger conveyors in supporting contact for the length thereof, said feed trough having an arcuate surface fixedly secured to said elongate housing upon which said auger conveyor is free to slidably rotate, first discharge means at a particular elevation associated with one of said chambers for discharging the food therein into a given area, second discharge means at a lower elevation associated with the other of said chambers for discharging the food contained therein to said same area, a continuous conveyor means positioned on the upper side of said housing in an overlying relation with said other chamber and adapted for conveyance of baled forage and the like, and drive means for driving each of said auger conveyors and said continuous conveyor means.

8. An animal feeding and bedding conveyance apparatus comprising, a housing divided into a pair of parallel longitudinal chambers laterally offset from each other, an auger conveyor rotatably positioned in each of said longitudinal chambers and adapted for conveyance of animal food such as feed and forage products, an arcuate feed trough underlying at least one of said auger conveyors in rotational supporting contact for the length thereof and having one edge positioned near the lowermost edge of said auger conveyor and the other edge terminating upwardly, said feed trough further having a trough side wall fixedly secured to the edge terminating upwardly, first discharge means at a particular elevation associated with one of said chambers for discharging the food therein into a given area, second discharge means at a lower elevation associated with the other of said chambers for discharging the food contained therein to said same area, a continuous conveyor means positioned on the upper side of said housing in an overlying relation with said other chamber and adapted for conveyance of baled bedding and the like, and drive means for driving each of said auger conveyor and said continuous conveyor means, whereby said auger conveyor being rotatably supported by said feed trough will be constantly urged toward said trough side wall.

9. An animal feeding and bedding conveyance apparatus comprising, a housing divided into a pair of parallel longitudinal chambers laterally offset from each other, an auger conveyor rotatably positioned in each of said longitudinal chambers and adapted for conveyance of animal food such as feed and forage products, a J-shaped feed trough supporting structure underlying at least one of said auger conveyors in rotational supporting contact therewith for the length thereof, first discharge means at a particular elevation associated with one of said chambers for discharging the food therein into a given area, second discharge means at a lower elevation associated with the other of said chambers for discharging the food contained therein to said same area, a continuous conveyor means positioned on the upper side of said housing in an overlying relation with said other chamber adapted for conveyance of baled bedding and the like, and drive means for driving each of said auger conveyors and said continuous conveyor means, whereby said auger conveyor being rotatably supported by said J-shaped feed trough will be constantly urged toward said trough side wall.

10. An animal feeding and bedding conveyance apparatus comprising, a housing divided into a pair of parallel longitudinal and substantially horizontal chambers laterally offset from each other at least one of which is adapted for conveyance of animal feed products, a conveyance means positioned in each of said chambers, said chamber adapted for conveyance of feed having a plurality of gravity discharge ducts spaced at intervals along the length thereof, an individual feed trap positioned below each of said discharge ducts for receiving feed therefrom, discharge means beneath said feed traps associated with the other of said chambers for discharging material from said other chamber into substantially the same region receiving feed from said feed traps, a continuous chain conveyor means positioned on the upper side of said housing and adapted for conveyance of baled straw and the like, and drive means for driving each of said conveyance means.

11. An animal feeding and bedding conveyance apparatus as set forth in claim 10 wherein each said individual feed trap has an adjustable bottom plate which upon adjustment will vary the volumetric capacity of each feed trap.

12. An animal feeding and bedding conveyance apparatus comprising, a housing divided into a pair of parallel longitudinal and substantially horizontal chambers, the first of said chambers being larger than the second chamber and located generally to one side thereof, said first chamber being adapted for conveyance of forage and the like to locations generally beneath said second chamber and the second chamber being adapted for conveyance of feed and the like, said second chamber having a plurality of gravity discharge ports, a feed trap positioned below each discharge port for controlling the discharge of feed to said locations, both said pair of chambers having a conveyance means rotatably positioned therein, said second chamber having lengthwise adjustable means, a continuous chain conveyor means positioned on the upper side of said housing and adapted for conveyance of baled bedding and the like, and drive means for driving each of said conveyance means and said chain conveyor.

13. An animal feeding and bedding conveyance apparatus as set forth in claim 12 wherein said first chamber further has a forage trap door therewith associated and said second chamber has a plurality of feed trap doors therewith associated, and means for independently opening said doors whereby said forage trap door may be opened and closed before said plurality of feed trap doors are opened.

14. An animal feeding and bedding conveyance apparatus as set forth in claim 12 wherein said lengthwise adjustable means for said second chamber comprises variable length sections of feed chamber connected end to end, whereby each discharge port and associated feed trap may be precisely positioned at predetermined locations along the length of said second chamber.

15. A combination comprising an animal feeding manger such as that associated with a cattle stanchion, and an animal feeding and bedding conveyance apparatus adapted to be positioned in a portion of said manger and adjacent said stanchions, said feeding and bedding apparatus having an elongate housing divided lengthwise into a pair of chambers, one of said chambers being a forage chamber and adapted for receiving and conveying forage, and the other of said pair of chambers being a feed chamber and adapted for receiving and conveying feed, conveyance means positioned in each of said pair of chambers, a first door means associated with said forage chamber and adapted to release forage into said manger, a second door means associated with said feed chamber and adapted to release feed into said manger, said second door means being positioned above said first door means whereby forage may be first deposited in said manger and feed thereafter deposited upon the forage.

16. An animal feeding and bedding conveyance apparatus comprising, a housing divided into a pair of parallel longitudinal chambers, the first of said chambers being larger than the second chamber and laterally offset therefrom, said first chamber being adapted for conveyance of forage and the like and the second chamber being adapted for conveyance of feed and the like, said second chamber being defined by a plurality of primary sections and a plurality of spacer sections, each of said primary sections having a gravity discharge port, a feed trap positioned below each discharge port, both said pair of chambers having a conveyance means rotatably positioned therein, and drive means for driving each of said conveyance means.

17. The apparatus of claim 16 and a shield element underlying a primary section in marginal engagement around the discharge port associated therewith, whereby to eliminate feed delivery at a particular manger location.

18. An apparatus for feeding animals such as dairy cattle comprising, an elongate and substantially horizontal housing, said housing being longitudinally divided into a pair of chambers, a conveyance means positioned in each of said chambers and adapted to convey cattle food products, first discharge means at a particular elevation associated with one of said chambers for discharging the food therein into a given area, second discharge means at a lower elevation associated with the other of said chambers for discharging the food contained therein to said same area, drive means for driving each of said conveyance means, and door means associated with each of said pair of chambers in a generally vertical position above each other, whereby said chambers may be pre-loaded and then subsequently unloaded into the same general area.

References Cited in the file of this patent

UNITED STATES PATENTS

| | | |
|---|---|---|
| 1,392,311 | Egeland | Oct. 4, 1921 |
| 2,613,799 | Bawden et al. | Oct. 14, 1952 |
| 2,615,424 | Spickler | Oct. 28, 1952 |